(No Model.) 2 Sheets—Sheet 1.

J. CHRISTIE.
DIFFERENTIAL PULLEY BLOCK.

No. 317,726. Patented May 12, 1885.

Witnesses:
John M. Clayton
Harry Drury

Inventor:
James Christie
by his Attys.
Howson & Sons (No Model.) 2 Sheets—Sheet 2.

J. CHRISTIE.
DIFFERENTIAL PULLEY BLOCK.

No. 317,726. Patented May 12, 1885.

Witnesses:
John M. Clayton
Harry Drury

Inventor:
James Christie
by his Attys.
Howson & Sons

UNITED STATES PATENT OFFICE.

JAMES CHRISTIE, OF PHILADELPHIA, PENNSYLVANIA, ASSIGNOR OF ONE HALF TO PERCIVAL ROBERTS, OF SAME PLACE.

DIFFERENTIAL PULLEY-BLOCK.

SPECIFICATION forming part of Letters Patent No. 317,726, dated May 12, 1885.

Application filed October 6, 1884. (No model.)

*To all whom it may concern:*

Be it known that I, JAMES CHRISTIE, a citizen of the United States, residing in Philadelphia, Pennsylvania, have invented certain Improvements in Differential Pulley-Blocks, of which the following is a specification.

My invention relates to pulley-blocks of which differential gearing forms a part; and my invention consists of certain improvements, described and claimed hereinafter, in pulley-blocks of this class, the said improvements being directed to the structural character of the pulley-block, with a view to simplicity and economy.

Figure 1:
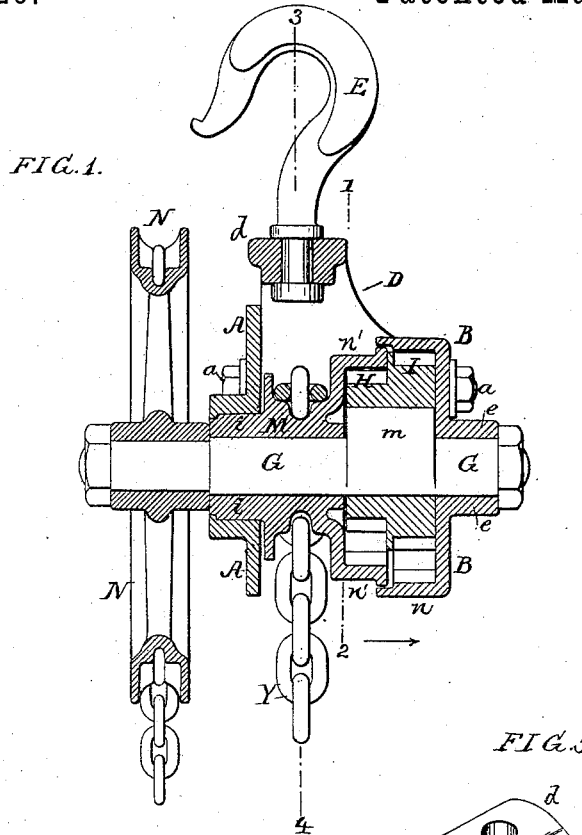
Figure 2:
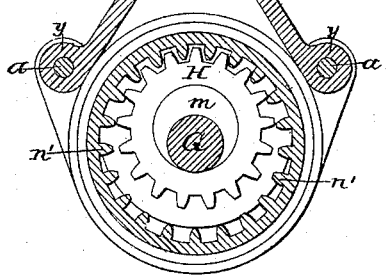
Figure 3:
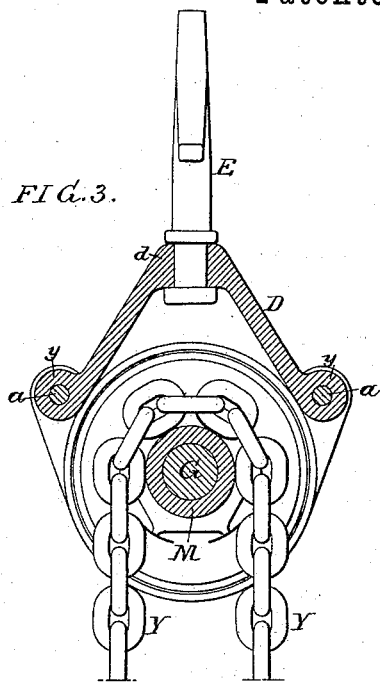
Figure 4:
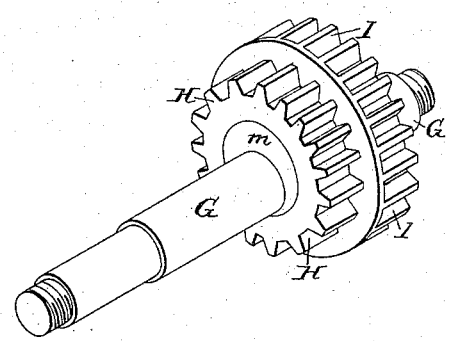

In the accompanying drawings, Figure 1, Sheet 1, is a vertical section, parts being in elevation, of the improved pulley-block; Fig. 2, a section on the line 1 2, Fig. 1, looking in the direction of the arrow; Fig. 3, Sheet 2, a section on the line 3 4, Fig. 1; Fig. 4, a perspective view of the shaft, eccentric, and gear wheels; and Fig. 5, a perspective view of the frame of the pulley-block.

The frame consists of the end plates, A and B, and the top piece, D, all being preferably steel castings, and being secured together by bolts $a$, passing through both plates A and B, and through tubular portions $y\ y$ of the casting D, and to the top $d$ of the said casting is swiveled the stem of a hook, E, as shown in Figs. 1 and 3.

A portion, $m$, of the shaft G is an eccentric, on which are two cog-wheels, H and I, cast in one piece, the latter wheel being of larger diameter and having more teeth than the former. The teeth of the wheel I gear into the teeth of the internal wheel, $n$, forming part of the plate B, and the teeth of the wheel H gear into those of an internal wheel, $n'$, forming part of a chain-pulley, M.

The shaft G has one bearing in a projection, $e$, of the plate B, the other bearing being in the chain-pulley M, and the hub $i$ of the latter having its bearing in the plate A of the frame.

A chain-pulley, N, of large diameter, is secured to the shaft G, and round this pulley passes an endless chain, by manipulating which the shaft G may be turned and the chain-pulley M rotated through the medium of the gearing described, the wheels H and I being also loose on the shaft.

Figure 5:
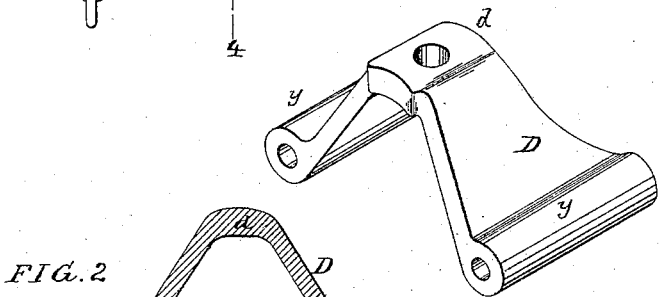

The manner in which the gearing operates to rotate the pulley M at a much less speed than the shaft, and consequently causes the pulley to act on the hoisting-chain Y with much more power than that exerted to drive the shaft G, will be understood by those skilled in the art, as the system of differential gearing constitutes a well-known mechanical movement which has heretofore been applied to many different mechanisms, and, among others, to pulley-blocks. It should be understood, therefore, that no new mode of action is involved in my invention, which is restricted to the special construction of the parts, with a view to general simplicity and economy. In the first place, the frame is a very simple structure, consisting, as it does, of three castings—namely, the plates A and B, and top piece D—which can be readily fitted together, the plate B forming one of the wheels of the differential gearing, and the top piece, D, being carried upward as shown in Fig. 5, for the direct connection to it of the hook E.

It will be seen that the chain-pulley and the internally-toothed wheel $n'$ are in one casting, the edge of this wheel being overlapped by the edge of the internally-toothed wheel $n$ forming part of the plate B, all the gearing being thus shielded.

Another feature contributing to simplicity of construction is the extension of the hub $i$ of the chain-wheel M into the plate A, so as to have its bearing therein, the chain-pulley and its hub being thus converted into a bearing for the shaft.

Disclaiming the differential gearing, consisting of the shaft, its eccentric, and the several wheels, I claim as my invention—

1. The combination, in a pulley-block, of differential gearing, substantially as described, with the frame consisting of the plates A and B and top piece, D, constructed and secured to each other substantially as set forth.

2. The combination of the frame consisting of the plates A and B and top piece, D, with the differential gearing, the chain-pulley M of which has a hub-bearing in the plate A, and with the shaft G extending through and having a bearing on the said chain-wheel, substantially as specified.

3. The combination, in a pulley-block, of the within-described differential gear, in which the wheels H and I are combined with and contained within the internally-toothed wheels $n\ n'$, the edge of one wheel overlapping that of the other, as set forth.

In testimony whereof I have signed my name to this specification in the presence of two subscribing witnesses.

JAMES CHRISTIE.

Witnesses:
HARRY SMITH,
HENRY HOWSON, Jr.